United States Patent [19]

Arimura

[11] 4,236,781

[45] Dec. 2, 1980

[54] ILLUMINATION SYSTEM FOR SPECIMEN

[75] Inventor: Yoshiaki Arimura, Yokohama, Japan

[73] Assignee: Tokyo Shibaura Electric Co., Ltd., Kawasaki, Japan

[21] Appl. No.: 11,992

[22] Filed: Feb. 14, 1979

Related U.S. Application Data

[63] Continuation of Ser. No. 770,792, Feb. 22, 1977, abandoned.

[30] Foreign Application Priority Data

Feb. 23, 1976 [JP] Japan .................................. 51-18018

[51] Int. Cl.³ ............................................ G02B 21/06
[52] U.S. Cl. ....................................... 350/81; 350/91; 350/235; 350/238
[58] Field of Search ................... 350/81, 91, 188, 235, 350/238; 356/209, 210, 446

[56] References Cited

U.S. PATENT DOCUMENTS

| | | | |
|---|---|---|---|
| 3,710,091 | 1/1973 | Holcomb | 350/91 UX |
| 3,941,486 | 3/1976 | Tyler | 350/81 X |

FOREIGN PATENT DOCUMENTS 500697  6/1938  United Kingdom ...................... 350/91

OTHER PUBLICATIONS

Circon Corp., "Circon MV 9100", Feb. 1, 1973.

Primary Examiner—John K. Corbin
Assistant Examiner—Matthew W. Koren
Attorney, Agent, or Firm—Oblon, Fisher, Spivak, McClelland & Maier

[57] ABSTRACT

A bonding apparatus for IC pellets is provided with an illumination system for illuminating the IC pellet and a microscope for observing the IC pellet. The illumination system is of reflected dark field illumination since the circuit pattern and pad for IC pellet bonding is coarse in the surface while the remaining IC pellet region has a mirror face. The illumination system includes a light source providing a spot light and a light reflecting plate for converting the spot light into scattered light. The light source and the light reflecting plate are both so disposed that the spot light from the light source is not directed directly to the pellet but directed to the light diffusion plate. The light diffusion plate is disposed so that the scattered light reflected by the light diffusion plate is directed to the pellet. The microscope is disposed so as to receive a specified light irregularly reflected by the pattern with coarse face in the light incident to the IC pellets.

11 Claims, 5 Drawing Figures

ILLUMINATION SYSTEM FOR SPECIMEN

This is a continuation of application Ser. No. 770,792, filed Feb. 22, 1977 now abandoned.

BACKGROUND OF THE INVENTION

The present invention relates to an illumination system for specimen and, more particularly, to the one of the reflected dark field illumination type for an optical apparatus for observing a small specimen such as IC (integrated circuit), for example, a microscope.

Generally, the illumination system for the microscope is categorically divided into a bright field illumination and a dark field illumination. For the illumination system for the microscope for observing opaque specimen such as metal peice, known are the bright field illumination of reflected type, i.e. the vertical illumination, and the dark field illumination of reflected type. The reflected bright field illumination is an illumination system in which the specimen is observed through the light rays regularly reflected by the specimen. The reflected dark field illumination is an illumination system in which the specimen is observed not by the direct light rays regularly reflected by the specimen, but by the scattered light reflected from the specimen.

Generally, the bonding apparatus for semiconductor devices such as IC and transistors and the automatic inspection apparatus for pellets handle small elements. For this, those apparatus is provided with microscopes for observing such small elements. The image of the element formed by the microscope is photographed by a television camera for televising. The microscope and its associated illumination system in the bonding apparatus or the automatic pellet inspection apparatus are mounted obliquely with respect to the element to be observed, i.e. the pellet surface. Such oblique disposition of the microscope arises from the fact that a capillary, a measuring needle or the like are disposed above the pellet. Further, the transmitted illumination can not be applied to the illumination for the microscope of the bonding apparatus, although permitting the reflected type illumination to be applicable thereto. The reason for this is that the pellet is opaque. This necessitates the oblique disposition of the illumination system with respect to the pellet surface, like the microscope.

The reflected type dark field illumination generally is used for the illumination for the microscope of the bonding apparatus. This follows the facts that the illumination system for the bright field illumination is complex and that the bonding position of the pellet is dark, thus resulting in poor observation. On the other hand, the reflected type dark field illumination provides a bright bonding position, thus giving good observation of the bonding position.

Thus, the bonding position of the pellet is easily confirmed by using the conventional bonding apparatus in which the reflected type dark field illumination is used with an oblique disposition thereof with respect to the pellet surface. It, however, is defective in that the image formed is dark as a whole with a poor contrast. Increase of luminous intensity of the illumination apparatus is one of solutions for the problem; however, this leads to bulkiness of the apparatus and brilliant portions appearing in the image. Improvement of image quality is insufficient.

SUMMARY OF THE INVENTION

Accordingly, an object of the present invention is to provide an illumination system capable of illuminating the specimen with a sufficient high contrast of image formed.

Another object of the present invention is to provide an illumination system which is adaptable for the specimen processing apparatus whose illumination system is restricted in terms of the installation place.

According to the present invention, there is provided an illumination system for specimen provided for means to observe the specimen through scattered light which is irregularly reflected by the specimen, comprising: light diffusion means disposed close to the specimen for providing scattered light onto the specimen for illumination; and light emitting means for providing a bundle of light rays to the light diffusion means where it is converted into scattered light.

Other objects and features of the present invention will be apparent from the following description taken in connection with the accompanying drawings, in which:

BRIEF DESCRIPTION OF THE DRAWINGS

In those drawings, like reference characters designate like or similar parts in several views.

DETAILED DESCRIPTION OF THE PREFERRED EMBODIMENTS

Figure 1:
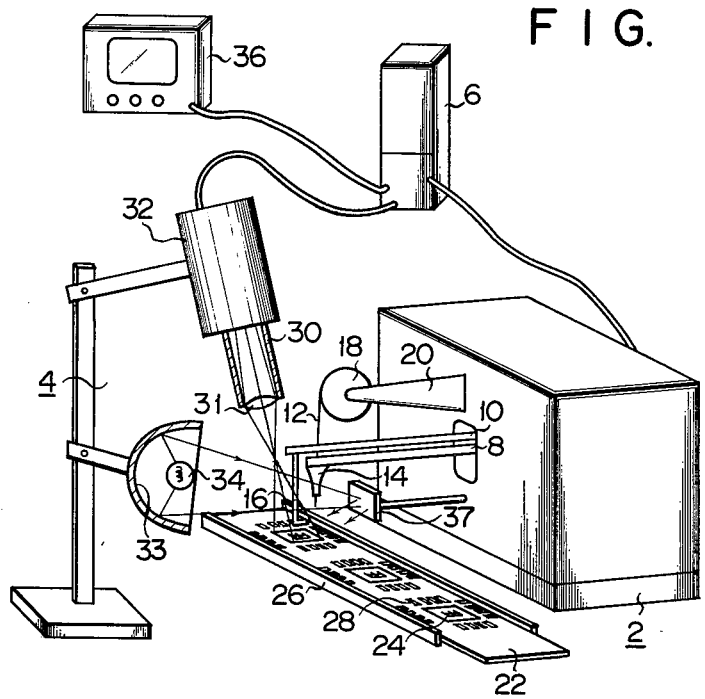
FIG. 1 is a perspective view of an automatic IC bonding apparatus into which an illumination system according to the present invention is incorporated.

The embodiments of the present invention to follow are illumination systems for a microscope of a bonding apparatus. It will be understood, however, that the illumination system according to the present invention will be applied not only to the illumination system for such a microscope but also to various optical apparatuses for which the reflected dark field illumination is applied.

Before proceeding with description of the embodiments of the illumination system for specimen according to the present invention, brief description will be given of an IC automatic bonding apparatus to which the illumination system of the present invention is applied, referring to FIG. 1.

The automatic bonding apparatus is comprised of a bonding machine 2, a specimen photographing apparatus 4 and a specimen position measuring apparatus 6. The bonding machine 2 includes therein a drive means for driving arms 8 and 10 in X, Y and $\theta$ directions. The arm 8 coupled with the drive means and substantially horizontally extending toward the specimen photographing apparatus 4, is provided at the end with a capillary 14 through which a gold wire 12 passes. At the end of the arm 10 coupled with the drive means and extending in parallel with the arm 8 in the same direction and cooperating with the arm 8, is fixedly mounted a torch 16 for blowing flame against the gold wire 12 extended out of the capillary 14 to form a gold welding ball at the top end of the capillary 14. The bonding machine 2 is provided with an arm 20 having a spool 18 at the top end. The gold wire 12 is supplied to the capillary 14 through the spool 18. Below the capillary 14, is positioned one of a number of IC pellets or chips 24 disposed on a frame 22. A guide member 26 guides the frame 22 in bonding operation in order that the IC pellet 24 is positioned under the capillary 14. External lead wires 28 to be bonded are formed on the frame 22 around the IC pellet 24.

The specimen photographing apparatus 4 is comprised of a microscope 30, an industrial TV camera for converting an image of the IC pellets or chips 24 formed by the microscope 30 into an electric video signal, a light source 34 for illuminating the pellet 24, and a TV receiver 36 for converting the video signal fed from the TV camera 32 into a picture. The combination of the microscope 30 and the industrial TV camera 32 is disposed so as to observe the pellet 24 in a slanted direction. More particularly, since the capillary 14 is positioned normally above the pellet 24, those camera 32 and microscope 30 are disposed obliquely above the capillary 14, with their optical axis slanted to the pellet 24 surface. The TV receiver 36 is used to monitor the bonding operation, with the pellet picture imaged.

The specimen position measuring apparatus receives the video signal and measures the inclination angle and position of the specimen of pellets and converts the results of measurement into coordinates signals of X, Y and $\theta$. The specimen position measuring apparatus is disclosed in U.S. Pat. No. 3,603,728 (corresponding to Japanese Patent Publication No. 39899/47 ('72), assigned to the same assignee as of the present application. In this apparatus, the position of the pellet is detected from the time relation of the detection of a mark on the pellet 24 for position detector by the camera 32 to the scanning start of the television camera. In response to the coordinates signals of X, Y and $\theta$ from the specimen position measurement apparatus 6, the drive means of the bonding machine 2 drives the arms 8 and 10 to position the capillary 14 above the pellet 24 to be bonded.

As described above, in the above-mentioned bonding apparatus, since various members such as capillary 14 are disposed around the pellet 24, disposition of the microscope 30 and the illumination apparatus, i.e. the light source 34 is restricted. It is for this reason that the microscope 30 and the light source 34 are disposed obliquely to the pellet 24. The IC pellet 24 is not light-transmitted material so that the illumination apparatus therefor is of reflected type. Accordingly, the light source 34 is disposed obliquely above the pellet as the microscope 30 and the pellet 24 is observed through reflection light. The bonding position of the pellet 24 is normally the aluminium pattern, i.e. the pattern pad and the surface of the pattern is coarse while the other region than the pattern surface is substantially of mirror face. For this, the illumination apparatus of the present invention is of dark field illumination type. With such a construction, most of light rays incident upon the region except the pattern are regular-reflected and none of them enter an objective lens 31 of the microscope 30. On the other hand, light rays incident upon the pattern are irregular-reflected and a part of them enter the objective lens 31 of the microscope 30. The image formed through the microscope 30 is a bright pattern with dark background, thereby resulting in an easy confirmation of the bonding position.

The illumination system of the present invention includes a diffusion plate 37 disposed closely to the specimen e.g. the pellet 24, in addition to the light source 34. Scattered light rays from the diffusion plate 37 illuminate the IC pellet 24. Since the IC pellet 24 is illuminated by the scattered light rays, the image of the pellet is brighter.

Figure 2:
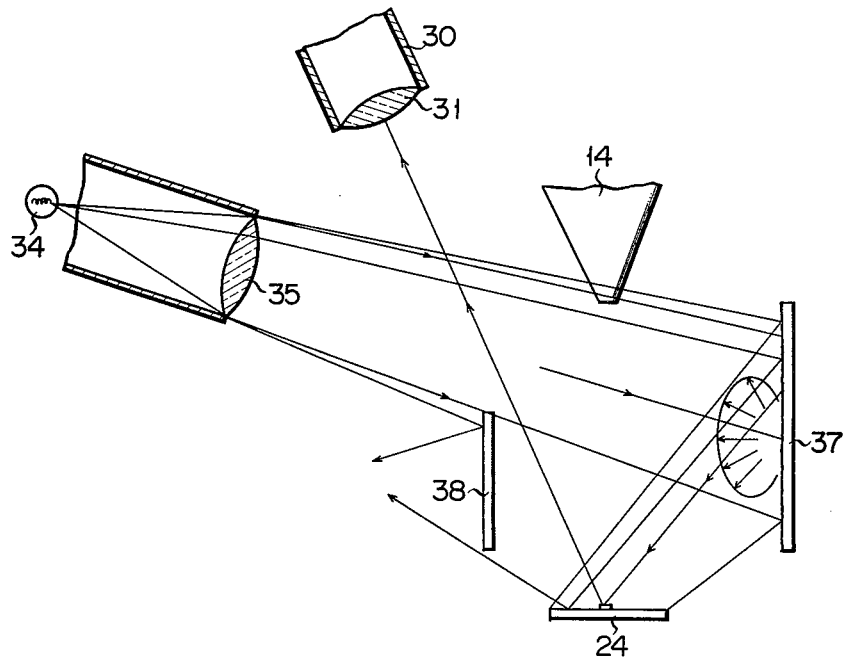
FIG. 2 is a schematic diagram illustrating an example of an illumination system according to the present invention.

As shown in FIGS. 1 and 2, a spot light of a bundle of parallel rays or forcused rays through a concave mirror 33 or a condenser lens 35 from the light source 34 is projected onto the diffusion plate 37 disposed closely to the IC pellet 24. The illumination of the pellet 24 is substantially made by the scattered light rays reflected from the diffusion plate 37. That is, none of the spot light projected from the concave mirror 33 or the condenser lens 35 illuminates the specimen and only the scattered light from the diffusion plate 37 which receives the spot light and reflects it in the form of scattered light, illuminates the pellet of specimen.

A bulb lamp is normally used for the light source 34. The lamp 34 is usually arranged in front of the reflecting mirror 33 and emits a spot light of a relatively intensive parallel light rays through the concave mirror 33 or the condenser lens 35, while the light rays reflected from the diffusion plate 37 which is a reflection light of the spot light is scattered light with a wide light distribution. For this, the scattered light reflected by the entire surface of the light diffusion plate 37 is projected on the pattern of the pellet 24 whose image is bright by the dark field illumination, that is the light rays of the scattered. Light enter the pattern in various direction. Accordingly, the light rays component irregularly reflected by the pattern becomes large and thus the amount of incident light to the objective lens 31 of the microscope 30 also increases. Thus, the amount of light rays reflected by the pattern is larger when the pellet 24 is illuminated by the scattered light than when it is illuminated by direct light. The former provides more clear and bright pattern images. More conveniently, since the diffusion plate 38 is positioned sufficiently close to the IC pellet 24, the pellet 24 is efficiently illuminated. The distance between the IC pellet 24 and the diffusion plate 37 is determined by considering the luminous intensity of the light source 34 and the image formed by the microscope 30, i.e. the picture of the TV receiver 32.

Referring to FIG. 2, there is found a light shield plate 38 as well as the diffusion plate 37. The shield plate 38 is disposed between the pellet 24 and the light source 34 to prevent direct incident of light to the pellet 24. Generally, the pattern of the pellet 24 slightly swells from the other region since it is formed by evaporation. If such portion of pattern is illuminated by an intensive bundle of light rays, the peripheral edges of the pattern are observed remarkably brilliant, with the result that the image by the microscope 30 is vague. It is for this reason that the shield plate is provided.

Figure 3:
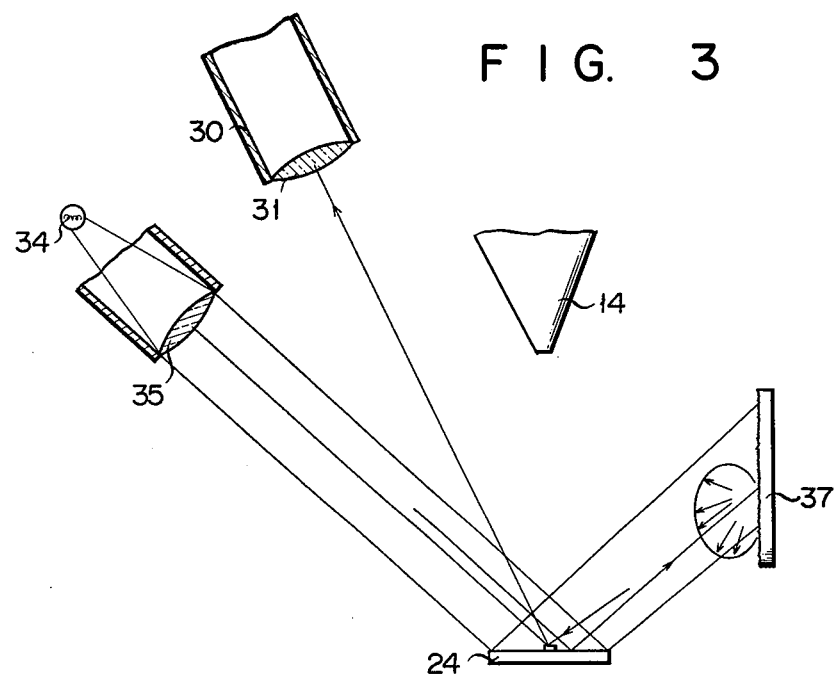
FIGS. 3 to 5 are schematic diagrams illustrating other embodiments of the illumination system according to the present invention.

Turning now to FIG. 3, there is shown another illumination system according to the present invention. In this system, the spot light from the light source 34 through the condenser lens 35 is directly projected onto the pellet 24, as in the conventional ones. The feature of this example distinguished from the conventional ones is that the diffusion plate 37 is disposed so that it reflects again the light rays regulately reflected by the pellet 24. In other words, the diffusion plate 37 is disposed at the regular reflection position of the light source 34 with respect to the pellet 24. As previously stated, most of the light rays incident upon the pellet 24 are regular-reflected and progress off the objective lens 31 of the microscope 30, in this example. However, the off-progressing light rays are reflected again and scattered by the diffusion plate 37 to illuminate the pellet pattern. The light rays of the scattered light are projected onto the pellet 24.

Since the illumination light of the pellet 24 is not only the spot light from the light source 34 but the scattered light reflected from the diffusion plate 37, the amount of the light irregularly reflected by the pattern 24 is increased and the amount of the light entered into the objective lens 31 increased. The FIG. 3 example is defective in that the peripheral edges of the pattern are brilliant and thus nuisance to see, compared with the FIG. 2 example. The advantage of the FIG. 3 example, however, is that the light from the light source 34 is effectively used eliminating a high intensive light source.

Figure 4:
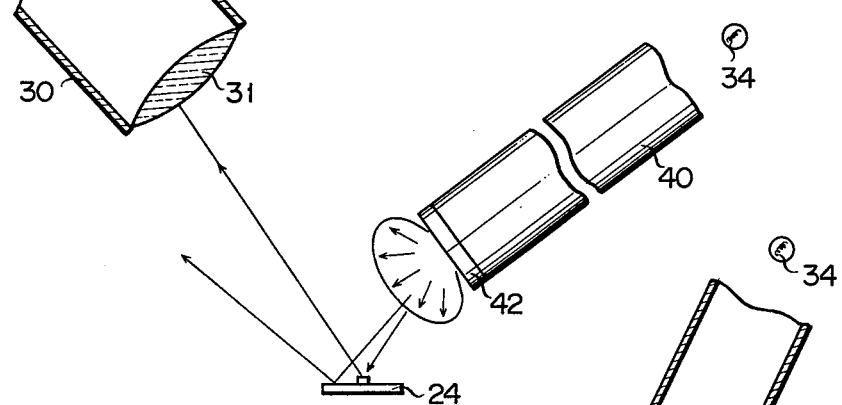

The embodiment shown in FIG. 4 uses an optical fiber or light guide 40 through which the light from the light source 34 is guided. In this example, the light from the light source 34 is guided through the optical fiber 40 to the light outlet end fitted with a light transmitting diffusion plate 42 such as an opal glass. The light guided to the light outlet end of the optical fiber 40 is scattered through the diffusion plate 42 to illuminate the pellet 24. As known, the optical fiber 40 is flexible with little loss of light passing therethrough. The light source 34 may be positioned at any place, provided that the light outlet end of the optical fiber 40 is directed to the pellet 24 while the light inlet end thereof is provided with the light source 34. Accordingly, even if the pellet 24 is surrounded by various members related to the bonding apparatus, the pellet 24 is sufficiently illuminated. Additionally, since the pellet 24 is illuminated by scattered light, the image obtained is distinctive with good contrast.

Figure 5:
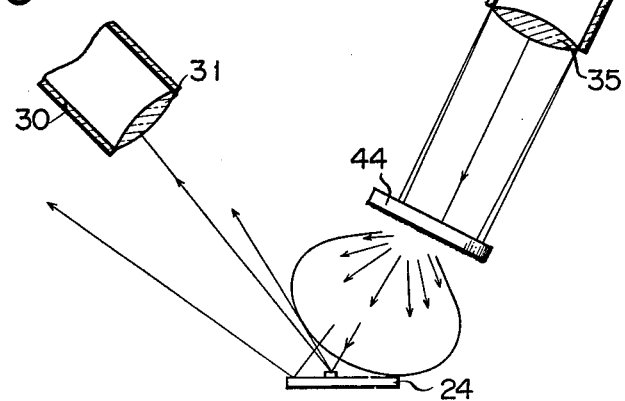

Reference is made to FIG. 5 illustrating another embodiment of the illumination system of the present invention in which a light transmitting diffusion plate 44 is disposed between the light source 34 and the pellet 24. Unlike the FIG. 2 embodiment, the transmitted scattered light is projected onto the pellet 24. The light transmitting diffusion plate 44 is easily disposed between the pellet and the light source if it is mounted to the tubular body enclosing the light source 34.

From the foregoing description, it will be understood that, according to the illumination system for specimen of the present invention, the specimen is illuminated with extremely high contrast, and, if the illumination system is restricted in the installation place, the specimen is sufficiently illuminated.

Various other modifications of the disclosed embodiment will be apparent to person skilled in the art without departing from the spirit and scope of the invention as defined by the appended claims.

What is claimed is:

1. An illumination system for illuminating a specimen the surface of which is substantially flat and has a substantially mirror portion and coarse portions and which is to be observed by means of a microscope with an optical axis inclined to the surface of the specimen, the system comprising:
light projecting means for projecting a bundle of light rays;
a light diffusion plate disposed close to the specimen for converting the bundle of light rays from the light projecting means into diffused light and projecting the diffused light onto the specimen; and
specimen holding means for holding the specimen at such a position that most light rays reflected from the mirror portion of the specimen are directed outside an objective lens of the microscope and outside the illumination system and light rays scattered from the coarse portions of the specimen are projected onto the objective lens of the microscope.

2. An illumination system for specimen according to claim 1, in which said light diffusion plate is a light reflecting diffusion plate for reflecting in scattered fashion the bundle of light rays given from said light projecting means, and said light emitting means is disposed directed toward said light reflecting diffusion plate with the bundle of light rays incident upon said light reflecting diffusion plate.

3. An illumination system for specimen according to claim 2, further including a shield means disposed between the specimen and said light projecting means to prevent direct projection of the light rays from said light projecting means to the specimen.

4. An illumination system for specimen according to claim 1, in which said light projecting means is disposed directed toward said specimen with the bundle of light rays incident upon the specimen, and said light diffusion plate is a light reflecting plate for diffusing a bundle of light rays from said light projecting means, and the light reflecting plate is disposed at the regular reflecting position of said light projecting means with respect to the specimen for converting the light rays regularly reflected by the specimen into scattered light in turn to be directed to the specimen.

5. An illumination system for specimen according to claim 1, in which said light diffusion plate is a transmitting diffusion plate permitting a bundle of light rays emitted from said light emitting means to pass therethrough in scattered fashion.

6. An illumination system for specimen according to claim 5, further including optical fiber disposed between said light projecting means and said light transmitting diffusion plate, for guiding a bundle of light rays from said light emitting means into said light transmitting diffusion plate.

7. An illumination system for specimen according to claim 1, in which said light projecting means further includes a condenser lens for converting said bundle of light rays from said light projecting means into a convergent bundle of rays.

8. An illumination system for specimen according to claim 1, in which said light projecting means further includes a condenser lens for converting said bundle of light from said light emitting means into a parallel bundle of rays.

9. An illumination system according to claim 1, wherein said specimen is an IC chip.

10. A bonding machine for connecting pattern pads of an IC chip having a substantially mirror surface portion and coarse surface portions to external lead wires of an IC chip mounting frame, using bonding wires, the machine comprising:
a capillary under which the IC chip is placed and the tip of which is movable between the pattern pads of the IC chip and the external lead wires of an IC chip mounting frame and provided with a welding metal ball to be bonded to the pattern pads and the external lead wires;
means for supplying said capillary with a metal wire;

a heater for heating the metal wire supplied to the tip of said capillary to provide a welding metal ball;

a microscope so positioned as to have its optical axis inclined to the surface of the IC chip;

an illumination apparatus for illuminating the IC chip, including light projecting means for projecting a bundle of light rays and a light diffusion plate disposed close to the IC chip for converting the bundle of light rays from the light projecting means into diffused light and projecting the diffused light onto the IC chip; and means for guiding the IC chip mounting frame with a number of IC chips mounted and placing one of IC chips at such a predetermined position under said capillary that most light rays reflected from the mirror portion of the IC chip are directed outside an objective lens of said microscope and light rays scattered from the coarse surface portions of the IC chip are projected onto the objective lens of the microscope.

11. A bonding machine according to claim 10, further including a TV camera for converting the image of the IC chip formed by said microscope into an electric video signal.

* * * * *